No. 629,471. Patented July 25, 1899.
G. F. ROOKE.
FARE REGISTER.
(Application filed Mar. 14, 1898.)

(No Model.) 3 Sheets—Sheet 1.

Witnesses: Inventor,
George F. Rooke,
By Offield, Towle & Linthicum
Atty's.

No. 629,471. Patented July 25, 1899.
G. F. ROOKE.
FARE REGISTER.
(Application filed Mar. 14, 1898.)
(No Model.) 3 Sheets—Sheet 2.
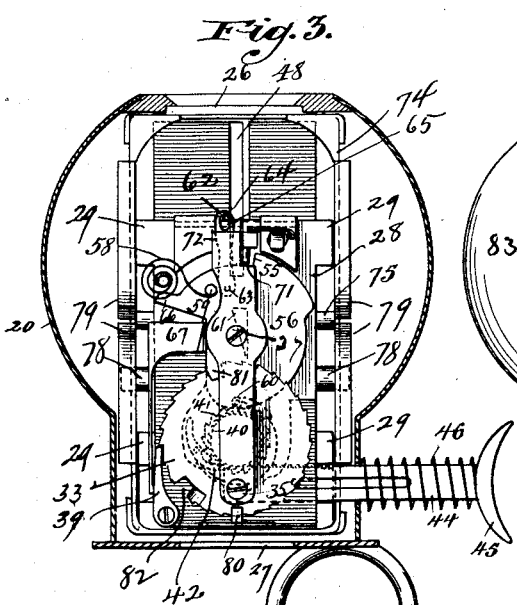
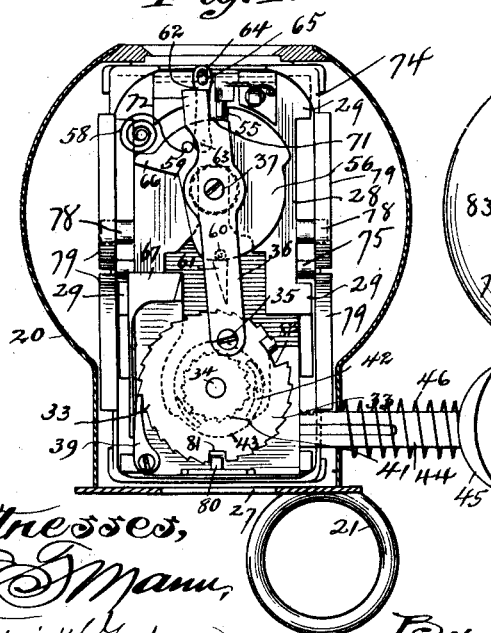
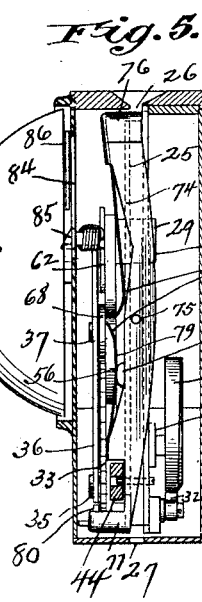
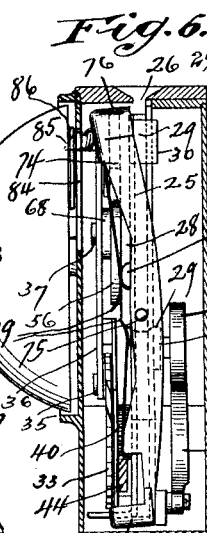
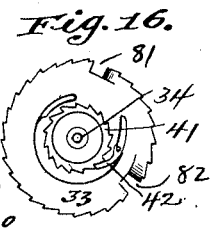
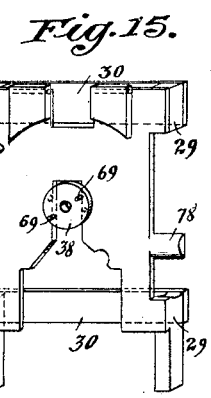
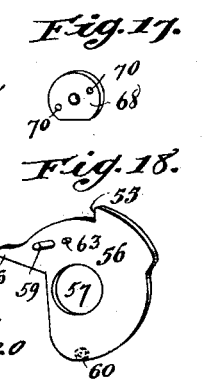
Witnesses,
Inventor,
George F. Rooke,
By Offield, Towle & Linthicum,
Attys.

No. 629,471. Patented July 25, 1899.
G. F. ROOKE.
FARE REGISTER.
(Application filed Mar. 14, 1898.)
(No Model.) 3 Sheets—Sheet 3.
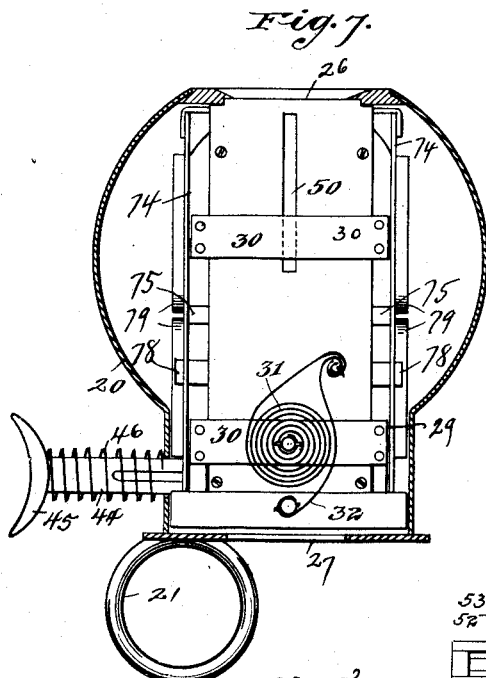
Fig. 7.
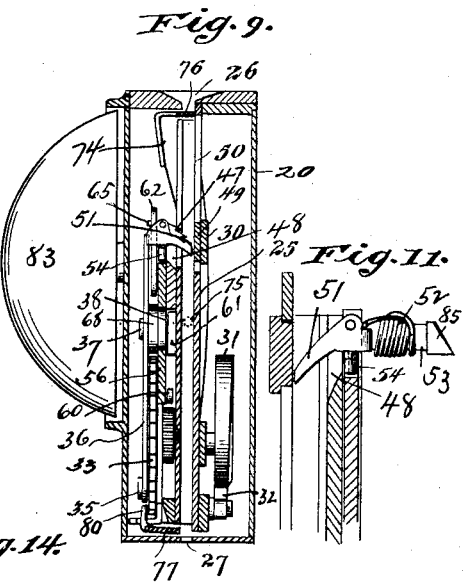
Fig. 9.
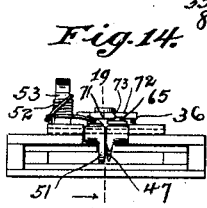
Fig. 14.
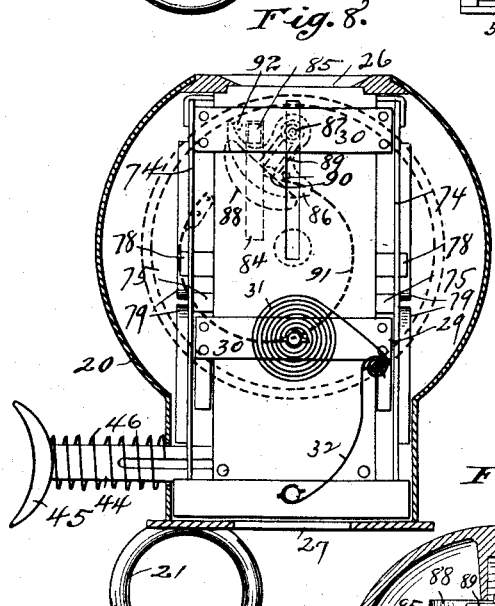
Fig. 8.
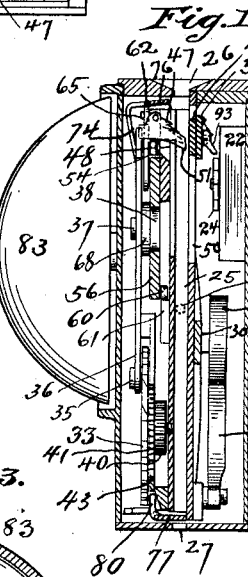
Fig. 10.
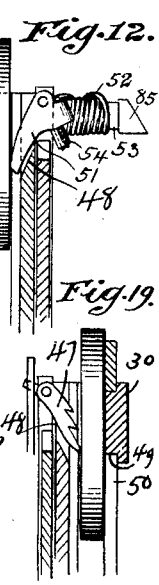
Fig. 12.
Fig. 11.
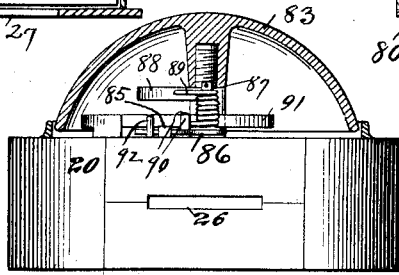
Fig. 13.
Witnesses,
Inventor,
George F. Rooke
by Offield, Towle & Linthicum,
Atty's.
THE NORRIS PETERS CO., PHOTO-LITHO., WASHINGTON, D. C.

UNITED STATES PATENT OFFICE.

GEORGE F. ROOKE, OF PEORIA, ILLINOIS.

FARE-REGISTER.

SPECIFICATION forming part of Letters Patent No. 629,471, dated July 25, 1899.

Application filed March 14, 1898. Serial No. 673,781. (No model.)

*To all whom it may concern:*

Be it known that I, GEORGE F. ROOKE, of Peoria, in the county of Peoria and State of Illinois, have invented certain new and useful Improvements in Fare-Registers, of which the following is a specification.

This invention relates to fare-registers and is in the general nature of an improvement upon the construction set forth in an application filed by me July 24, 1897, Serial No. 645,818.

My present invention has for its object to provide a portable mechanism adapted to be carried in the hand of the conductor or fare-collector and to receive a coin or token to be deposited therein by the passenger in payment of his fare, said mechanism being so constructed that upon the depositing of the coin or token the same will be seized and positively drawn into the register, which will thereupon register its deposit, the coin passing out of the register into the hands of the conductor.

To these ends my invention consists in certain novel features, which I will now proceed to describe and will then particularly point out in the claims.

Figure 1:
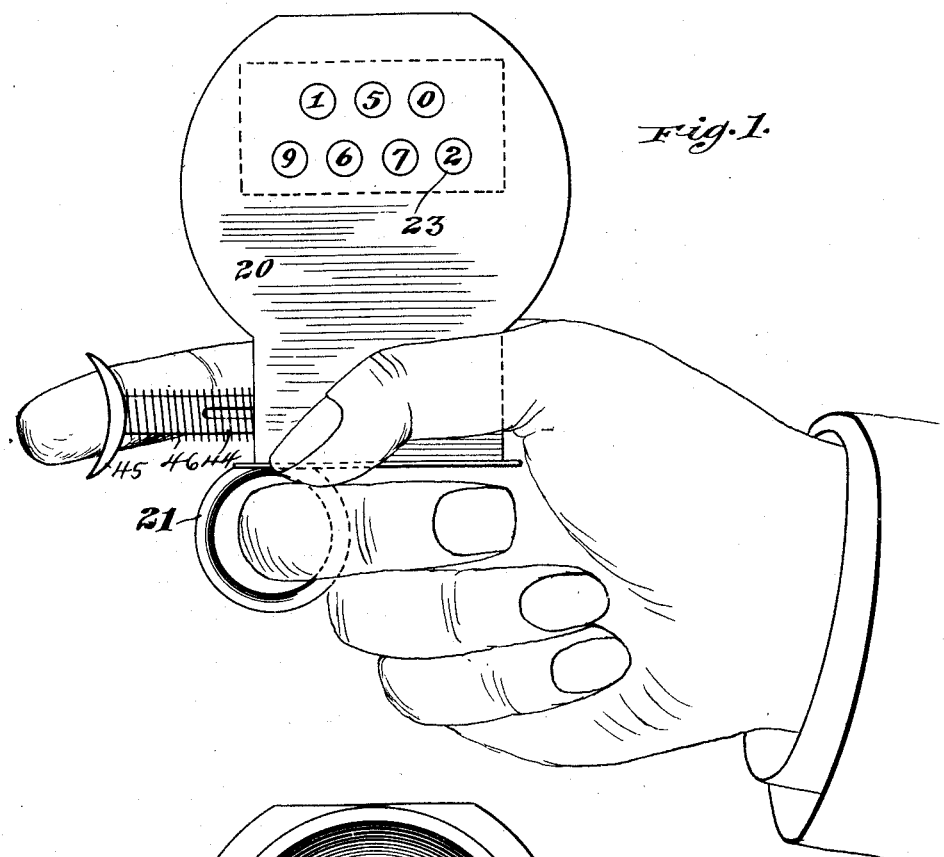
Figure 3:
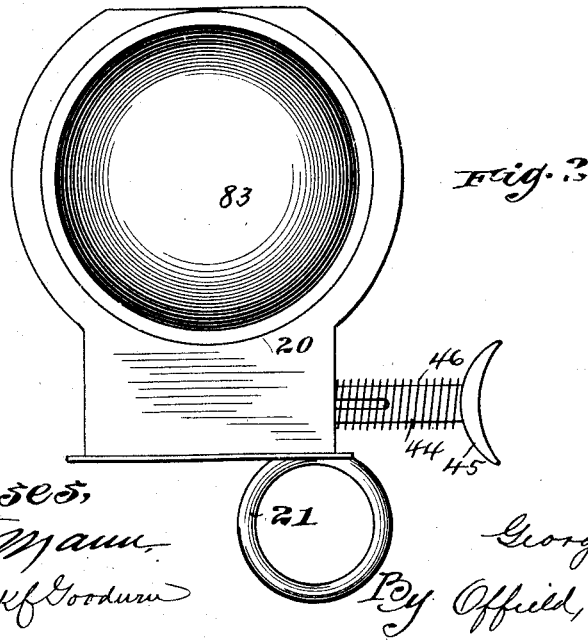

In the accompanying drawings, Figure 1 represents a front elevation of a register embodying my invention, said figure illustrating also the mode of holding and operating the same. Fig. 2 is a rear elevation of the register. Fig. 3 is an elevation, one side of the case being omitted, showing the mechanism in the position assumed thereby after the registration of the passage of a coin. Fig. 4 is a similar view showing the parts in the position assumed when the mechanism is set and ready to receive a coin. Fig. 5 is a side elevation with portions of the case omitted, showing the parts in the unset or normal position shown in Fig. 3. Fig. 6 is a similar view showing the parts in the set position shown in Fig. 4. Fig. 7 is an elevation similar to Fig. 3, but showing the mechanism as viewed from the opposite side, the parts being in the unset or normal position. Fig. 8 is a view similar to Fig. 7, but showing the parts in their set position ready to receive a coin, the bell mechanism being indicated in dotted lines. Fig. 9 is a central vertical sectional view showing the parts in their normal or unset position. Fig. 10 is a view similar to Fig. 9, showing the parts in their set position ready to receive a coin. Fig. 11 is an enlarged detail sectional view similar to a portion of that shown in Fig. 9, but viewed from the opposite side. Fig. 12 is a similar view illustrating the tripping of the detent by the passage of a coin. Fig. 13 is a plan view of the register inclosed, the bell being in section to show the operating mechanism thereof. Fig. 14 is a plan view of the coin-chute and its mechanism detached, the shutter being omitted. Fig. 15 is a detail perspective view of the movable frame detached. Fig. 16 is a face view of the rear or under side of the crank-wheel detached, being the face opposite to that shown in Fig. 3. Fig. 17 is a detail perspective view of the cam-plate washer. Fig. 18 is a similar view of the camplate detached; and Fig. 19 is a detail sectional view similar to Fig. 12, taken on the line 19 19 of Fig. 14 and looking in the direction of the arrow.

In the said drawings, 20 represents a suitable casing which contains the mechanism of the register and which may be of any suitable form and construction. In practice I prefer the form shown in Figs. 1 and 2, and I also prefer to provide the casing with a ring 21, through which the finger may be inserted to enable the register to be more firmly held. This casing will in practice be provided with a seal, lock, or other suitable means to prevent unauthorized access to the inclosed mechanism or to indicate that such access has been had. This feature is, however, usual in portable registers and forms no part of my invention.

Within the case 20 is located a registering mechanism 22 of any approved form, the casing being provided with apertures 23, by means of which the figures of the register may be observed from the exterior of the case.

24 indicates a projecting part or member of the registering mechanism, said part or member being adapted to be engaged by a portion of the mechanism hereinafter described and in consequence of said engagement operate the registering mechanism simultaneously with the operation of said other mechanism. It is to this latter mechanism, which I term the "register-operating" mechanism and by means of which the deposit of the coin in the register is caused to be indicated by the registering mechanism, that my present invention particularly relates. Said mechanism is constructed in the following manner:

25 indicates a coin-chute which extends directly through the register from top to bottom, the case having an opening 26 at the upper or receiving end of said chute and an opening 27 at the lower or discharge end thereof. This chute is secured in position in the case in any suitable manner and serves as a base or frame, on which the various portions of the mechanism are mounted and supported.

28 indicates a frame mounted to slide vertically on the chute 25 and guided thereby, being provided for this purpose with rearwardly-extending portions 29 at top and bottom, which fit against the edges of the frame, and with bars 30, located one at the top and the other at the bottom of the frame and secured to the projections 29, which they connect in pairs, thereby forming loops, which embrace the chute and act as guides. This sliding frame is normally moved downward toward the bottom of the chute by means of a suitable spring, and for this purpose I have shown a coil-spring 31, mounted on the rear face of the lower cross-bar 30 of the sliding frame and connected with the base of the chute by means of a link 32. The spring 31 is secured at its inner end to a fixed pin on the cross-bar 30, and said spring is a coiled spring, having its outer or free end extended tangentially and connected to the free end of the link 32, the other end of said link being secured to the base of the chute. It will be seen that when the parts are in the position shown in Fig. 7 upward motion imparted to the frame will act to coil the spring around its pin against its resistance, so that when the frame is raised the spring is tightly coiled, as shown in Fig. 8, and the tendency of the spring to uncoil serves to give the sliding frame a tendency to move downward toward the base of the chute when released.

In order to raise the sliding frame into proper operative position to receive a coin, I employ a wheel 33, loosely mounted on a fixed axis 34, projecting from the coin-chute, said wheel being provided with an eccentric-pin 35, to which is connected the lower end of a lever 36, said lever being connected near its upper end to the sliding frame 28 by means of a screw or pin 37, which enters an aperture in a cylindrical boss 38, secured to the sliding frame, as shown in Fig. 15. The wheel 33 is provided with ratchet-teeth on its edge, which are engaged by a spring-pawl 39, which prevents rotation of said wheel in one direction and permits it to move only in the direction desired. Rotation of the wheel 33 will obviously through the lever 36 raise the sliding frame from the lowered position shown in Fig. 3 to the raised position shown in Fig. 4, and this rotation is preferably effected by the following means:

40 indicates a pinion mounted loosely on the axis 34, and 41 indicates a ratchet-wheel connected to and moving with said pinion.

42 indicates a spring-pawl mounted on the inner or rear face of the wheel 33 and normally engaging with the ratchet-wheel 41.

43 indicates a cam-plate, the cam-surface of which engages the heel of the spring-pawl 42 and holds the same out of engagement with the ratchet-wheel 41 during a portion of the revolution of the wheel 33.

44 indicates a sliding bar provided along a portion of its edge with a rack which meshes with the pinion 40. This sliding bar extends through the case to the exterior thereof and is provided with a finger-grip 45 and a spring 46, which throws the bar normally outward. It will be at once seen that pressing the bar 44 inward will rotate the pinion and ratchet-wheel 41, and through the medium of the pawl 42 rotary motion will be imparted to the wheel 33 to lift the sliding frame 28 to its upper position, as shown in Fig. 4. When in this position, the cam-plate 43 engages the pawl 42 and disengages said pawl from the ratchet-wheel, so that inward pressure upon the bar 44 will not affect the wheel 33 or the mechanism connected therewith. When the parts are in the lowered position shown in Fig. 3, however, the pawl 42 has passed clear of the cam-plate 43 and has again engaged the ratchet 41, so that pressure on the bar 44 will reset the sliding frame to its uppermost position.

The sliding frame 28 is provided with a toothed dog 47, pivoted thereon at its upper edge and extending into the coin-chute through a slot 48 therein. The cross-bar 30 of the sliding frame opposite this toothed dog is provided with a projection 49, which extends into the coin-chute through a slot 50 therein, said projection forming a fixed jaw, with which the movable jaw constituted by the toothed dog 47 coöperates. The sliding frame is held in its uppermost position by means of a detent 51, pivoted on the upper edge of said frame adjacent to the toothed dog 47 and extending through the slot 48 into the coin-chute. This detent is provided with a spring 52, coiled on a post 53, projecting from the sliding frame, said spring bearing upon the detent, so as to force the same normally outward into the coin-chute in the position indicated in Fig. 11. The detent is provided with a pin 54, preferably carrying an antifriction-roller, which pin engages with a shoulder 55 on a cam-plate 56, mounted on the sliding frame. This cam-plate, which is shown in detail in Fig. 18, is preferably mounted on the boss 38, which receives the screw 37, being provided with an opening 57, which fits over said boss. A spring 58, mounted on the sliding frame and connected to a pin 59 on the cam-plate 56, tends to rotate said cam-plate on its axis in a direction such as to move the shoulder 55 toward the detent 51 when the pin 54 of said detent is moved clear of said shoulder. On its rear or under face the cam-plate 56 is provided with a pin or roller 60, which is adapted when the sliding frame is raised to rest upon the flat upper face of a fixed triangular cam 61, formed on or secured to the coin-chute. The cam-plate 56 also has connected to it a link 62, the cam-plate being provided with a pin 63, which forms the pivot to which the lower end of said link is connected. The upper end of said link is slotted, as shown at 64, and the toothed dog 47 is provided with a pin 65, which engages said slot. The cam-plate 56 is further provided with an arm 66, which is adapted when the frame is in its lowermost position to engage with a fixed stop or projection 67 on the coin-chute.

68 indicates a washer, secured on the boss 38 by means of pins 69 on said boss, which enter apertures 70 in the washer. Said washer is thus interposed between the cam-plate 56 and the lever 36. The upper end of the lever beyond this pivotal point is cut away, as shown at 71, to permit the pin 54 of the detent to swing clear of the cam-plate 56, and the projecting extremity 72 of said lever, which in the course of its movement extends both over the link 62 and the pin 54, is beveled at the edge adjacent to said pin, as shown at 73.

74 indicates the shutter-frame, which is pivoted at its middle to projections 75 from the coin-chute. This shutter-frame is provided with a shutter 76 at its upper end for closing the mouth or receiving end of the coin-chute and with a shutter 77 at its lower end for closing the lower or discharge end of the chute. The construction is such, owing to the central pivoting of the shutter-frame, that when one of the shutters is extended across the chute the other is withdrawn therefrom. The shutter-frame and shutters are operated by means of projections 78, extending laterally outward from the sliding frame 28 and passing under springs 79, secured to the shutter-frame. When the sliding frame 28 is in its lowermost position, the projections 78 have passed under the lower pair of springs 79 and have forced the lower end of the shutter-frame outward, thereby opening the lower shutter 77 and closing the upper shutter 76. When the sliding frame is at its uppermost position, the projections 78 have passed under the upper pair of springs 79 and have thereby opened the upper shutter 76 and closed the lower shutter 77. In order to positively lock the shutter in this latter position, with the upper shutter 76 closing the mouth or receiving end of the coin-chute, the shutter-frame is provided at its lower end with a projecting pin 80. When the sliding frame is in its uppermost position, this pin is opposite a notch 81 in the periphery of the wheel 33, so that the shutter-frame is free to vibrate by the passage of the pin 80 through the notch 81 in such a manner as to open the upper shutter and close the lower one. During the descent of the sliding frame as the wheel 33 rotates the pin 80, which lies back of the wheel, comes opposite a second notch 82 in the periphery of the wheel, said second notch having inclined side walls. By the time this notch has been brought opposite the pin 80 the projections 78 have passed under the lower set of springs 79 and tend to throw the lower end of the shutter-frame outward. This causes the pin 80 to pass out through the notch 82 and rest upon the outer face of the wheel 33. This engagement of the pin 80 with the wheel 33 holds the shutter-frame in a fixed position, with the upper shutter closing the mouth of the coin-chute, and said upper shutter is held locked in this closed position until the notch 81 is again brought opposite the pin 80 by the rotation of the wheel 33 in bringing the sliding frame to its uppermost position.

In conjunction with the register I prefer to employ an audible signal, which indicates to the ear the fact that the register has been operated, and for this purpose I mount upon the outer side of the case a bell 83. The end of the post 53 extends through a slot 84 in the case and is provided with a beveled head 85.

86 indicates a cam-plate extending across the slot 84 and pivoted to a post 87, said cam-plate being capable not only of a swinging movement on its pivot, but being also capable of yielding outward to permit the passage under it of the inclined head 85.

88 indicates the striker of the bell, which is provided with an elastic or spring stem 89 of wire, the body of which is coiled around the post 87, one end of said wire carrying the striker 88, while the other end passes between two pins 90 on the plate 86, thereby serving to connect said plate with the striker to cause the two to move in unison.

91 indicates a spring one end of which is secured to the casing and the other to the plate 86, said spring holding the plate normally across the slot 84 and returning it to said position when displaced. Upon the downward movement of the sliding frame the head 85 of the post 53 will swing the plate 86 downward until it passes clear of the same, when the spring 91 will return said plate forcibly to its original position, where it is held by said spring against a stop-pin 92. This movement will cause the striker to come in contact with the bell by reason of the elasticity of its supporting-wire, the striker springing back from its contact with the bell in the usual manner. Upon the upward or return movement of the sliding frame the beveled face of the head 85 will pass under the plate 86 and will lift the same until said head is passed clear of said plate, when said plate will fall again and will assume the position shown in dotted lines in Fig. 8, ready to be again engaged by the head.

Any suitable means may be employed for connecting the sliding frame or any of its moving parts with the register in such a manner as to operate the same at each movement of said sliding frame. In Fig. 10 of the drawings I have shown as a provision to this end a projecting spring-pawl 93, pivoted to the upper rear cross-bar 30 of the sliding frame and adapted to engage with the member 22 of the registering mechanism on the downward movement of the frame in order to operate said registering mechanism, said spring-pawl yielding on the upward movement so as to pass the member 22 without actuating the registering mechanism.

It being understood that the apparatus is to receive only a coin of a denomination equal to the exact fare or a metallic ticket or token of equivalent value, the operation of the device is as follows: The register may be conveniently held in the hand of the conductor or fare-collector in the manner shown in Fig. 1 of the drawings and will not practically inconvenience him or hamper his movement. When a fare is to be collected, the register is held out to the passenger, the parts thereof being in the position shown in Figs. 4, 6, 8, and 10 of the drawings, the shutter 76, which controls the receiving end of the register, being open, so that the register is adapted to receive the coin or token. Upon the insertion of the coin by the passenger it comes in contact with the detent 51, and this latter is swung upon its pivot, as indicated in Fig. 12, until its pin 54 passes clear of the shoulder 55 on the cam-plate 56. The spring 58 thereupon rocks the cam-plate on its pivot, and this rocking of the cam-plate produces two results. In the first place, the toothed dog 47 is rocked upon its pivot by the link 62, so that the coin is firmly clamped and held between said toothed dog and the projection 49 on the cross-bar 30 of the sliding frame. At the same time the rocking of the cam-plate on its pivot causes the roller 60 to pass clear of or beyond the flat upper surface of the triangular cam 61. As soon as this occurs the spring 31 immediately draws the sliding frame and the parts carried thereby rapidly downward to its lowest limit of motion, thereby drawing the coin downward through the chute, the upper end of which is at the same time closed by the shutter 76, which is locked in this closed position in the manner already described. As the sliding frame approaches its limit of downward motion the arm 66 of the cam-plate 56 comes in contact with the fixed stop or projection 67, and the cam-plate is rocked back to its original position during the final period of the descent of the sliding frame. This rocking back of the cam-plate causes the toothed dog to be swung upon its pivot in such a way as to release the coin, which thereupon drops out through the lower end of the coin-chute, the shutter 77 having been opened at the same time that the shutter 76 closes. The swinging back of the cam-plate also carries the shoulder 55 clear of the pin 54 of the detent 51, and said detent is rocked by its spring 52 so as to bring the pin once more in front of the shoulder and hold the cam-plate from movement in the direction in which the spring 58 tends to move it. Upon this downward movement of the sliding frame the registering mechanism has been operated to register the passage of the coin and the bell has been sounded in the manner hereinbefore described. The coin in passing out of the register drops directly into the hand of the conductor and is available for making change. The register is now in the position shown in Figs. 3, 5, 7, and 9 of the drawings, with the receiving end of its chute positively closed by the shutter 76, so that it cannot be used to receive a fare until reset. This is accomplished by pressing upon the rack-bar 44, whereupon the pinion 40 will be rotated and the ratchet-wheel 41 will rotate along with said pinion. At this time the pawl 42 has passed clear of the cam-plate 43, so that the wheel 33 is rotated along with the pinion and ratchet-wheel until by its rotation the lever 36 has restored the sliding frame to its uppermost position. During this upward movement of the parts the roller 60 travels along the inclined side of the triangular cam 61 until the end of said inclined surface is reached, whereupon the spring 58 swings the cam-plate upon its pivot so as to bring the shoulder 55 against the pin 54 of the detent, and this slight motion of the cam-plate brings the roller 60 above the flat upper surface of the triangular cam 61. This occurs when the pin 35 is about in line with or slightly beyond the point where it is in line with the pivots 34 and 37, so that the tension of the spring 31 draws the sliding frame down a trifle and brings the roller 60 in contact with the flat upper surface of the triangular cam 51, and thereby locks the parts in position ready to receive another coin. During this upward movement of the sliding frame the upper shutter has been opened and the lower shutter closed in the manner hereinbefore described. Moreover, during this upward movement the upper extremity 72 of the lever 36 has swung over the pin 54 of the detent-lever and by its beveled edge has insured a proper movement of said pin and detent to bring it into proper position to engage the shoulder 55 of the cam-plate. As the upward movement is completed the upper end of the lever again swings clear of the detent-pin, so as to bring opposite the same its cut-away portion 71, and thereby permit said pin to swing clear of the shoulder when the detent is again depressed. When another coin is inserted, the cycle of operations just described proceeds as before, the passage of each coin being registered.

The general advantages of the system of fare collection employed in connection with registers of the type herein set forth have been fully explained in my prior application hereinbefore referred to. The particular advantages attendant upon the present construction are that as soon as the coin is inserted in the register and trips the detent the coin is immediately, positively, and firmly gripped and carried into the register in a practically instantaneous manner, so that it is impossible in practice to insert a coin to an extent sufficient to operate the register and then withdraw the same without allowing it to pass through the register and into the possession of the conductor. I am also enabled to employ an actuating-spring of much greater strength, thereby insuring the proper actuation of the register-operating mechanism, while the connection between the said operating mechanism and the means for resetting it from the exterior of the register are of such a nature that when the register is set it cannot be affected by operating the external resetting means.

Various modifications in the details of construction may be made without departing from the principle of my invention, and I therefore do not wish to be understood as limiting myself strictly to the precise details of construction hereinbefore described, and shown in the drawings.

I claim—

1. A fare-register, comprising a registering mechanism, a movable frame for actuating the same, a spring for moving said frame from the receiving-point toward the discharge-point of the register, gripping devices on said frame for positively gripping the coin, and a detent mechanism for releasing said frame, adapted to be operated by the insertion of a coin, substantially as described.

2. A fare-register, comprising a registering mechanism, a movable frame adapted to operate said registering mechanism, a spring to move said frame from the receiving-point toward the discharge-point of the register, gripping devices on the frame for positively gripping a coin, spring-actuated mechanism for operating said gripping devices, and a detent adapted to be operated by the insertion of a coin to release said frame and the mechanism for actuating the gripping devices, substantially as described.

3. A fare-register, comprising a registering mechanism, a movable frame adapted to operate said registering mechanism, a spring to move said frame from the receiving-point toward the discharge-point of the register, gripping devices on the frame for positively gripping the coin, spring-actuated mechanism for operating said gripping devices, a detent adapted to be operated by the insertion of a coin to release said frame and the mechanism for actuating the gripping devices, and means for releasing said gripping devices when the frame has reached its limit of motion, substantially as described.

4. A fare-register, comprising a registering mechanism, a movable frame for actuating the same, a spring for moving said frame from the receiving-point toward the discharge-point of the register, gripping devices on said frame for positively gripping the coin, a detent mechanism for releasing said frame, adapted to be operated by the insertion of a coin, a shutter for closing the receiving end of the register after each registration, and means for locking said shutter in its closed position until the mechanism is reset, substantially as described.

5. A fare-register, comprising a coin-chute, a frame mounted to slide on said coin-chute, a spring for moving said sliding frame from the receiving to the discharge end of said chute, coin-gripping devices carried by said frame, a detent adapted to be released by the insertion of a coin in said chute, and a registering mechanism operated by the movement of the frame, substantially as described.

6. A fare-register, comprising a coin-chute, a frame mounted to slide on said chute, coin-gripping devices on said frame, a spring for moving said frame from the receiving to the discharge end of the chute, spring-actuating mechanism for operating the gripping devices, a detent adapted to be operated by the insertion of a coin to release said sliding frame and the mechanism for actuating the gripping devices, means for releasing said gripping devices when the frame has reached the discharge end of the chute, and a registering mechanism operated by the movement of the frame, substantially as described.

7. In a register of the character described, the combination, with the coin-chute and the movable frame mounted thereon and provided with gripping devices and means for actuating the same, of a spring for moving said sliding frame from the receiving to the discharge end of the chute, a detent controlling said movement and adapted to be released on the insertion of a coin in the chute, a wheel provided with an eccentric-pin, a lever connected to said eccentric-pin and to the sliding frame, and means for actuating said wheel from the exterior of the case to return the sliding frame to the receiving end of the chute, substantially as described.

8. In a register of the character described, the combination, with a coin-chute having a fixed cam or stop thereon, of a spring-actuated frame mounted to slide on said chute and provided with a detent and gripping devices and a spring-actuated cam-plate having a shoulder to engage the detent and a projection to engage the cam or stop, substantially as described.

9. In a register of the character described, the combination, with a coin-chute having a fixed cam or stop, of a spring-actuated frame mounted to slide on said chute and provided with a detent and with a pivoted gripping-dog, and a spring-actuated cam-plate pivoted on said frame and having a projection to engage the fixed cam, a shoulder to engage the detent, and a link whereby it is connected with the gripping-dog, substantially as described.

10. In a register of the character described, the combination, with a coin-chute provided with a fixed cam and a fixed stop, of a spring-actuated frame mounted to slide on said chute and provided with a detent and with a pivoted gripping-dog, and a spring-actuated cam-plate pivoted on said frame and having a projection to engage the fixed cam, a shoulder to engage the detent, a link whereby it is connected with the pivoted dog, and an arm arranged to engage the fixed stop at the limit of motion of the frame, substantially as described.

11. In a register of the character described, the combination, with a coin-chute having opposite longitudinal slots, of a sliding frame provided with means for actuating the same, and with a gripping-dog extending through one of the slots, said frame embracing the chute and being provided on the opposite side thereof with a projection which extends through the other of said slots and coöperates with the gripping-dog, substantially as described.

12. In a register of the character described, the combination, with a coin-chute, and a spring-actuated frame sliding thereon and provided with gripping devices and a detent, of a lever pivoted to said frame, a shutter-frame centrally pivoted on the chute, a wheel to which said lever is eccentrically pivoted, said wheel also serving to control the position of the shutter-frame during a portion of its movement, and means for actuating said wheel from the exterior of the register, substantially as described.

13. In a register of the character described, the combination, with the coin-chute and sliding frame thereon, of a lever pivoted to said sliding frame, a wheel to which said lever is eccentrically connected, said wheel being provided with notches in its periphery, means for actuating said wheel from the exterior of the register, and a shutter-frame pivoted on the chute and having a projection adapted to pass through said notches and alternately engage the opposite faces of said wheel, substantially as described.

14. In a register of the character described, the combination, with the sliding frame, of a lever pivoted thereto, an actuating-wheel to which said lever is eccentrically connected, said actuating-wheel having a spring-pawl mounted on its inner face, a cam engaging the heel of said pawl during a portion of the revolution of the wheel, a ratchet-wheel with which the toe of said pawl engages when free of the cam, a pinion rotating with said ratchet-wheel, and a sliding rack-bar meshing with said pinion and adapted to be operated from the exterior of the register, substantially as described.

15. A fare-register, comprising a registering mechanism, means for operating the same, a coin-chute, a shutter located at the exposed receiving-mouth of said chute and adapted when closed to prevent the insertion of a coin, means accessible to the operator for opening said shutter, detent mechanism for holding said shutter in its open position, and automatic means actuated by the insertion of a coin in the chute for releasing said detent mechanism and closing said shutter after the coin has passed the same, substantially as described.

GEORGE F. ROOKE.

Witnesses:
J. M. GRAHAM,
A. KEITHLEY.